United States Patent
Moore et al.

(10) Patent No.: US 10,350,606 B2
(45) Date of Patent: Jul. 16, 2019

(54) STOMPER FOR FOOD GRINDER

(71) Applicant: Hamilton Beach Brands, Inc., Glen Allen, VA (US)

(72) Inventors: Devin Lee Moore, Decatur, GA (US); Brian Andrew Wong-Shui, Atlanta, GA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 187 days.

(21) Appl. No.: 15/080,091

(22) Filed: Mar. 24, 2016

(65) Prior Publication Data

US 2017/0274385 A1  Sep. 28, 2017

(51) Int. Cl.
| | | |
|---|---|---|
| *A22C 7/00* | (2006.01) | |
| *B02C 18/30* | (2006.01) | |
| *B02C 18/22* | (2006.01) | |
| *A22C 17/00* | (2006.01) | |

(52) U.S. Cl.
CPC ........ *B02C 18/305* (2013.01); *A22C 17/0026* (2013.01); *B02C 18/2233* (2013.01); *B02C 18/302* (2013.01)

(58) Field of Classification Search
CPC ........ A47J 43/04; A47J 43/044–43/046; A47J 43/07–43/0722; A47J 43/082; A47J 43/085; A47J 43/04427; A32L 13/55; B02C 18/30–18/305; B02C 18/2233; A22C 7/00; A22C 7/0023
See application file for complete search history.

(56) References Cited

U.S. PATENT DOCUMENTS

| | | | |
|---|---|---|---|
| 1,942,082 A | 1/1934 | Biancalana | |
| 2,526,498 A | 10/1950 | Pacciano | |
| 2,665,724 A | 1/1954 | Lundell | |
| 2,792,042 A | 5/1957 | Dwyer | |
| 3,771,729 A | 11/1973 | Frable | |
| 4,180,229 A | 12/1979 | Schulein | |
| 6,332,376 B1 * | 12/2001 | Hurley | B25C 11/00 7/144 |
| 6,460,791 B1 | 10/2002 | Stehr | |
| 7,207,510 B2 | 4/2007 | Wong | |
| D577,273 S * | 9/2008 | Chen | D8/81 |
| 2003/0129274 A1 | 7/2003 | Garwood | |
| 2006/0243837 A1 * | 11/2006 | Wong | B02C 18/305 241/82.1 |
| 2007/0040055 A1 | 2/2007 | Riendeau et al. | |
| 2016/0318032 A1 | 11/2016 | Palese et al. | |
| 2016/0332166 A1 | 11/2016 | Chen | |

* cited by examiner

*Primary Examiner* — Jun S Yoo
(74) *Attorney, Agent, or Firm* — Alexander D. Raring

(57) ABSTRACT

A stomper for a food grinder comprises a distal end adapted to push food into a receiving tube of a food grinder, a proximal handle end adapted for a user to grasp the stomper while pushing food into the receiving tube of the food grinder, an elongated shaft between the distal end and the proximal handle end, a channel defined in the proximal handle end, and a bayonet projecting from one or more internal walls of the channel. The bayonet is adapted to engage a protrusion on an auger of the food grinder to apply a pulling force to remove the auger from the food grinder.

4 Claims, 5 Drawing Sheets

STOMPER FOR FOOD GRINDER

BACKGROUND OF THE DISCLOSURE

The present disclosure relates generally to food grinders and accessories therefor.

A food grinder is an appliance that grinds meat and other foods. An auger propels the food toward a rotating blade. The auger is removable by a user for cleaning. This is conventionally accomplished by hand. However, the auger can be difficult to remove, particularly after using the grinder.

It is known to create a special, single-purpose tool to help remove the auger. However, such special, single-purpose tools are undesirable. They take up additional room in the packaging of the box, increasing costs associated with packaging and shipping the appliance. Therefore, they increase the cost of buying a food grinder and may be misplaced by the user. The user must also clean the tool as it comes into contact with the auger that has processed raw meat.

It has heretofore not been discovered how to create a food grinder in which the auger is readily removed without the use of a special, single-purpose tool. The stomper and food grinder system of the following disclosure accomplishes the above and other objectives and overcomes at least the above-described disadvantages of conventional food grinders.

BRIEF SUMMARY OF THE DISCLOSURE

A stomper for a food grinder is disclosed herein. In one embodiment of the subject device, a stomper for a food grinder comprises a distal end adapted to push food into a receiving tube of a food grinder, a proximal handle end adapted for a user to grasp the stomper while pushing food into the receiving tube of the food grinder, an elongated shaft between the distal end and the proximal handle end, a channel defined in the proximal handle end, and a bayonet projecting from one or more internal walls of the channel. The bayonet is adapted to engage a protrusion on an auger of the food grinder to apply a pulling force to remove the auger from the food grinder.

The channel may be defined in an end surface and a side surface of the proximal handle end. The bayonet may project from three internal walls of the channel. The bayonet may have a curved engaging surface.

In addition to the stomper for a food grinder, as described above, other embodiments of the invention are directed to a food grinder system. Such a food grinder system comprises a food grinder and a stomper. The food grinder comprises a base housing a motor, a throat portion coupled to the base, a receiving tube coupled to the throat, and a selectively rotatable auger selectively insertable into and removable from the throat portion. The receiving tube is adapted for receiving food to be ground and introducing the food to be ground into the throat portion. The auger has a protrusion on a front end thereof. The stomper comprises a distal end for pushing food into the receiving tube of the food grinder, a proximal handle end adapted for a user to grasp the stomper while pushing food into the receiving tube of the food grinder, an elongated shaft between the distal end and the proximal handle end, a channel defined in the proximal handle end, and a bayonet projecting from one or more internal walls of the channel. The bayonet is for engaging the protrusion on the auger of the food grinder to apply a pulling force to selectively remove the auger from the food grinder.

In addition to the stomper for a food grinder and food grinder system, as described above, other embodiments of the invention are directed to methods for removing an auger from a food grinder. Such a method comprises positioning a stomper adjacent a food grinder such that a protrusion on an auger of the food grinder is at least partially within a channel defined in a proximal handle end of the stomper, engaging the protrusion on the auger with a bayonet projecting from one or more internal walls of the channel, and applying a pulling force to remove the auger from the food grinder. The proximal handle end is opposite a distal end adapted to push food into a receiving tube of the food grinder

BRIEF DESCRIPTION OF THE SEVERAL VIEWS OF THE DRAWINGS

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the disclosure is not limited to the precise arrangements and instrumentalities shown. In the drawings.

DETAILED DESCRIPTION OF THE DISCLOSURE

Figure 1:
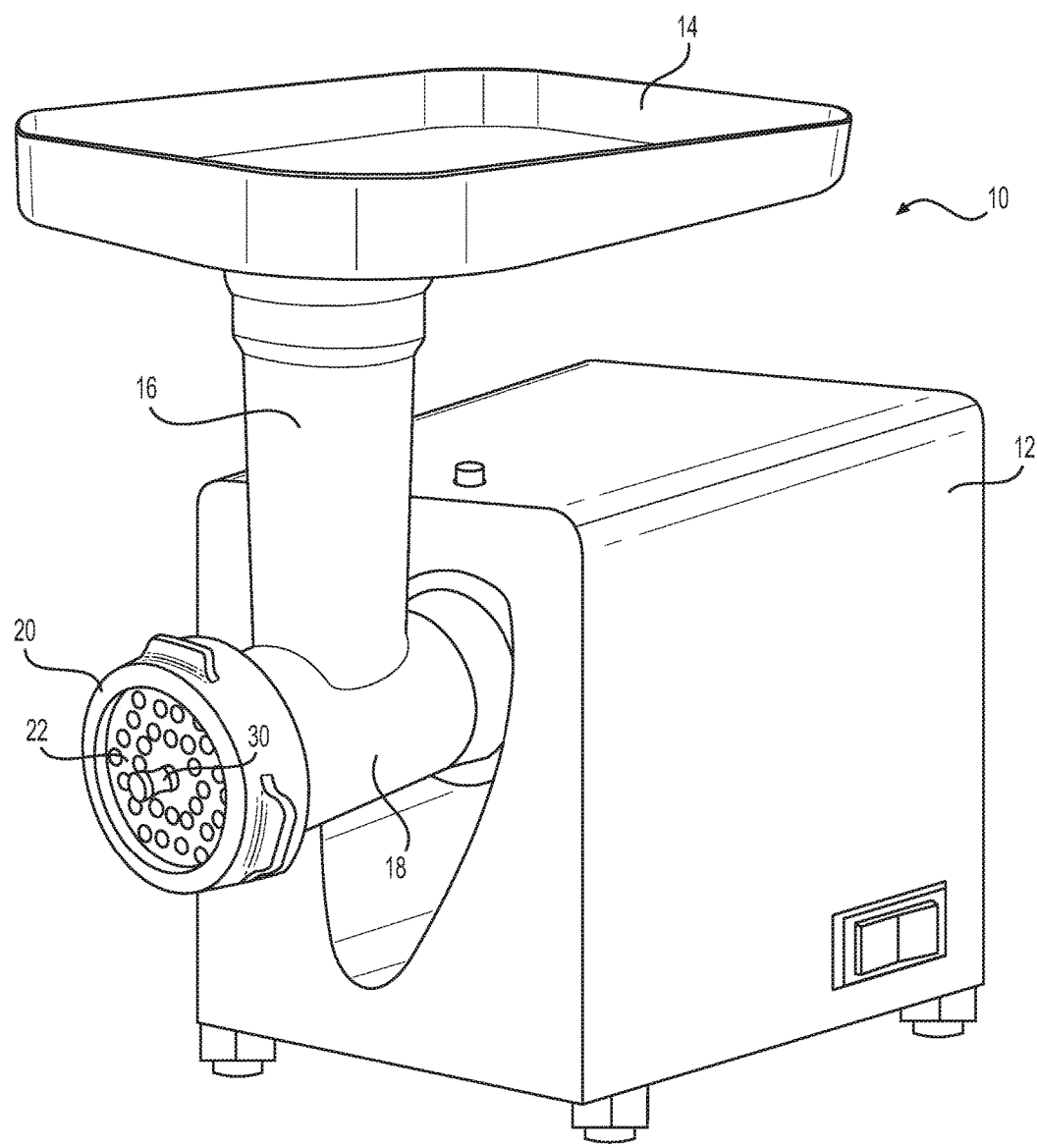
FIG. 1 is a perspective view of a food grinder, according to one embodiment of the invention.
Figure 2:
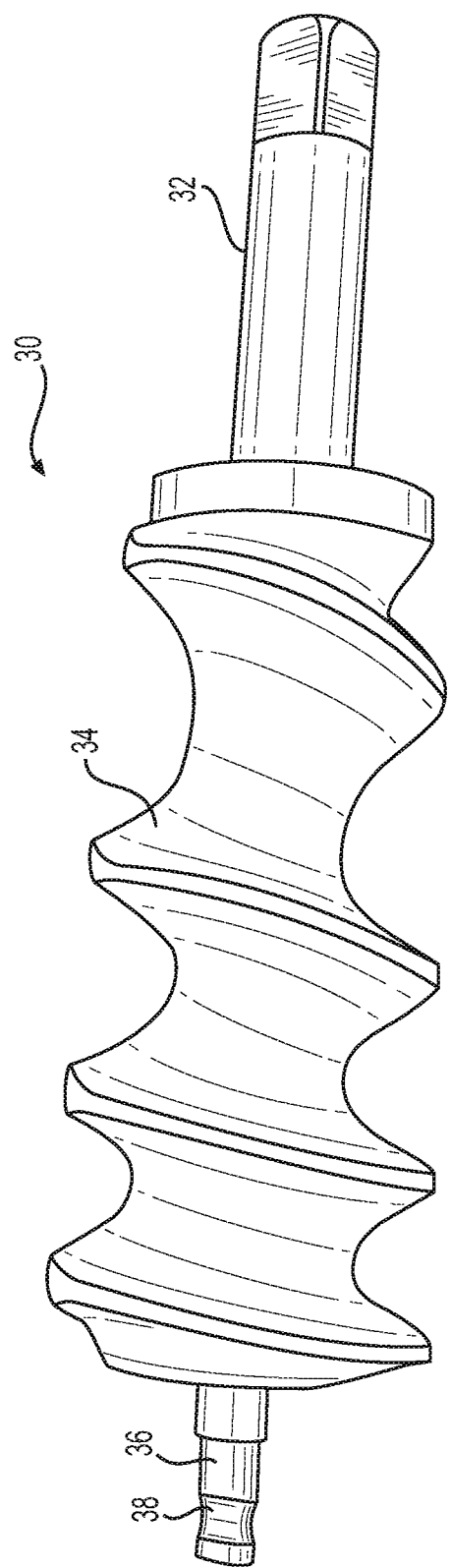
FIG. 2 is a side view of an auger of the food grinder of FIG. 1, removed from the food grinder.

Certain terminology is used in the following description for convenience only and is not limiting. The words "lower," "bottom," "upper," and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein like numerals indicate like elements throughout, FIGS. 1-5 illustrate a food grinder system and stomper for a food grinder in accordance with a preferred embodiment of the present disclosure. A stomper, also called a pusher or a plunger, is used to push food into the food grinder while keeping a user's hands safely away from any moving parts that could potentially injure the user.

The food grinder system of embodiments of the present disclosure comprises a food grinder 10 and a stomper 50. The food grinder 10 comprises a base 12 housing a motor (not illustrated), a throat portion 18 coupled to the base, a receiving tube 16 coupled to the throat, and a feeding tray 14 (also termed a hopper tray) coupled to an upper end of the receiving tube 16. Food to be ground may be placed on the feeding tray 14 and directed toward a hole (not illustrated) that leads to the receiving tube 16. A stomper 50 may be used to push the food down into the receiving tube 16. A selectively rotatable auger 30 is inserted into the throat portion, such that a shaft 32 at the inner end of the auger engages with the motor. The auger has a spiraling main body 34 for propelling food and a protrusion 36 at the outer end. The protrusion 36 has a circumferential groove 38. A rotating blade (not illustrated) may be placed on the protrusion 36. A disk or plate 22 with a plurality of holes (different disks are typically available with different sizes holes) is placed on the protrusion 36. A locking nut 20 is screwed or otherwise affixed onto the end of the throat portion 18 to secure the disk 22, the blade (if equipped), and the auger 30 in place.

It is also known that the auger may be connected to accessory auger for sausage making. See, for example, U.S. Pat. No. 7,144,316. The auger still serves the role of propelling a meat product from a receiving tube through a throat portion.

To operate the food grinder 10, the motor is powered on, which rotates the auger and the blade (if equipped), and food is pushed down into the receiving tube 16 until the food reaches the auger 30. The rotating auger propels the food toward the grinder outlet. If a blade is equipped, it grinds the meat and the finished product is propelled out through the disk 22. For sausage making, the meat is pushed into a tube. Additional or alternative accessories for the grinder appliance may be employed. However, the auger is the motive force for the food through the grinder appliance.

After the food processing is complete, the food grinder 10 needs to be disassembled for cleaning, as would be understood by one familiar with the art. As part of the disassembly, the auger 30 is pulled out of the throat portion 18. A user may attempt to remove the auger by pulling on the protrusion 36. However, as discussed above, the protrusion will likely be greasy. Further, any residual meat product may make pulling the auger difficult. It can be difficult to remove the auger by hand.

Figure 3:
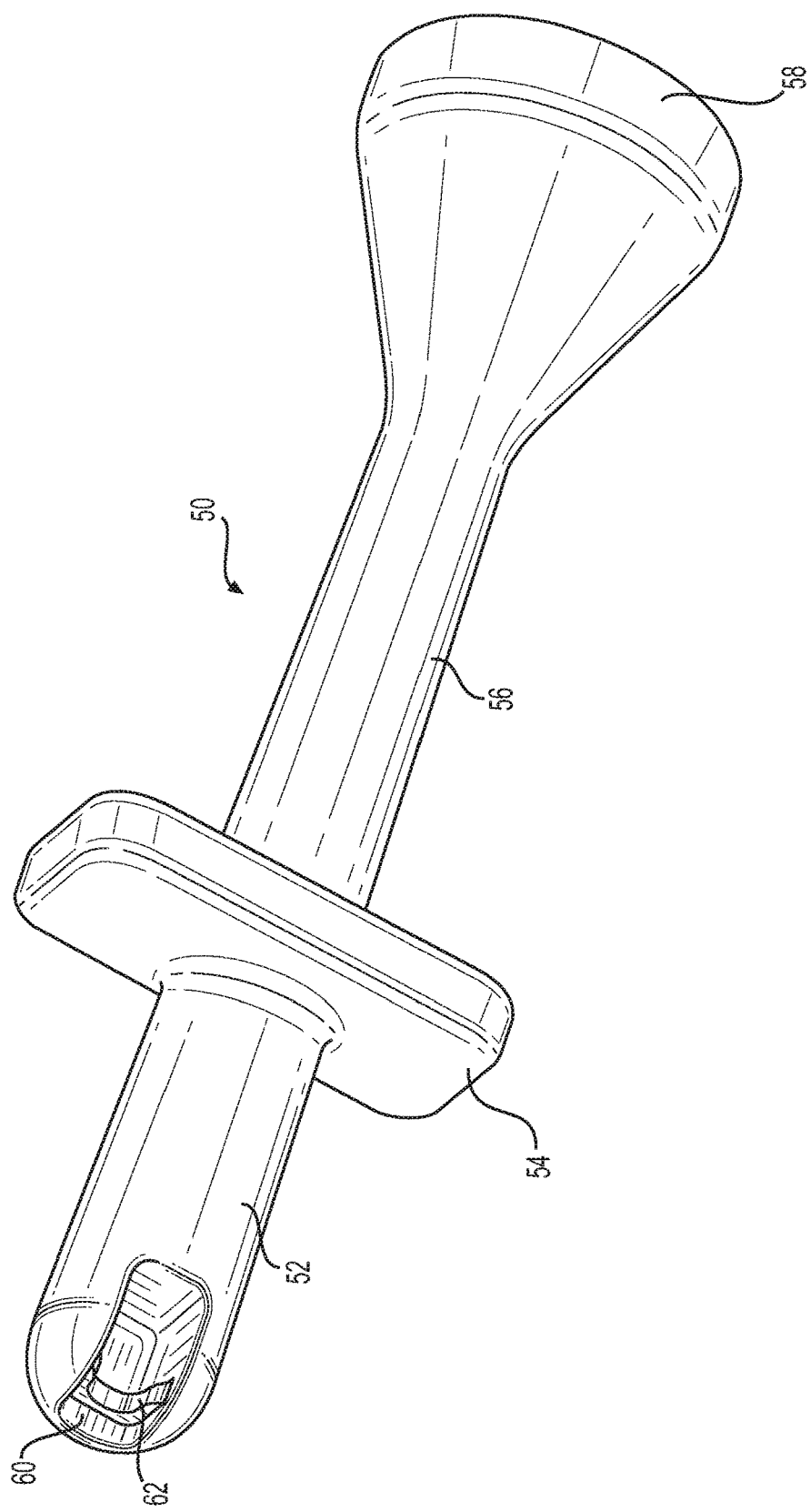
FIGS. 3 and 4 are perspective views of a stomper for use with the food grinder of FIG. 1, according to one embodiment of the invention.
Figure 4:
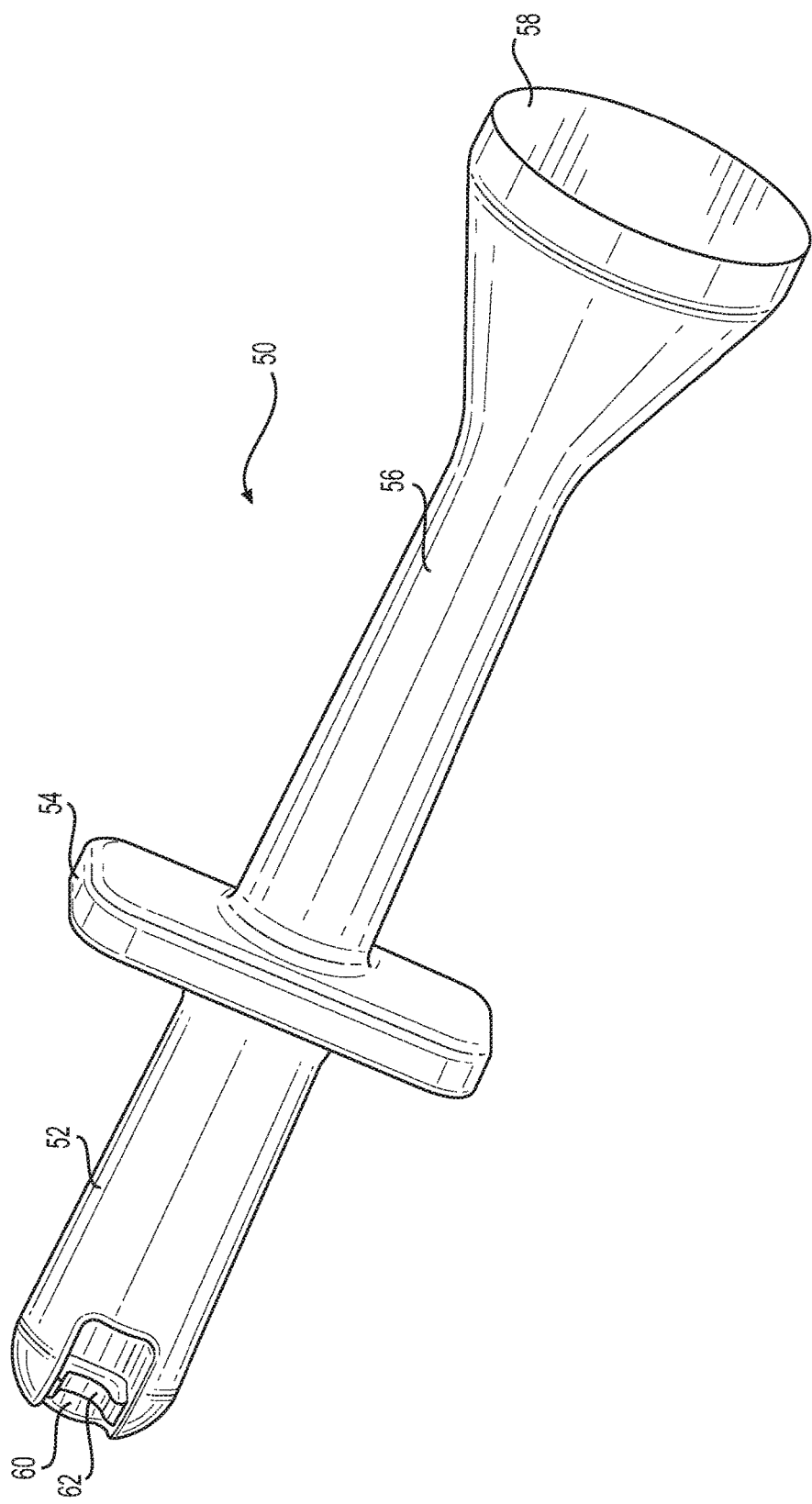

A stomper 50 for use with a food grinder of embodiments of the present disclosure is illustrated in FIGS. 3 and 4. The stomper 50 comprises an elongated shaft 56 with a distal end 58 sized and shaped to push food into the receiving tube and a proximal handle end 52 for a user to grasp and hold the stomper 50. The distal end 58 may be flared as illustrated. The stomper 50 may have a guard 54 to limit how far the stomper can be inserted into the receiving tube 16 and to help ensure that the user's hand is kept away from the receiving tube 16.

Figure 5:
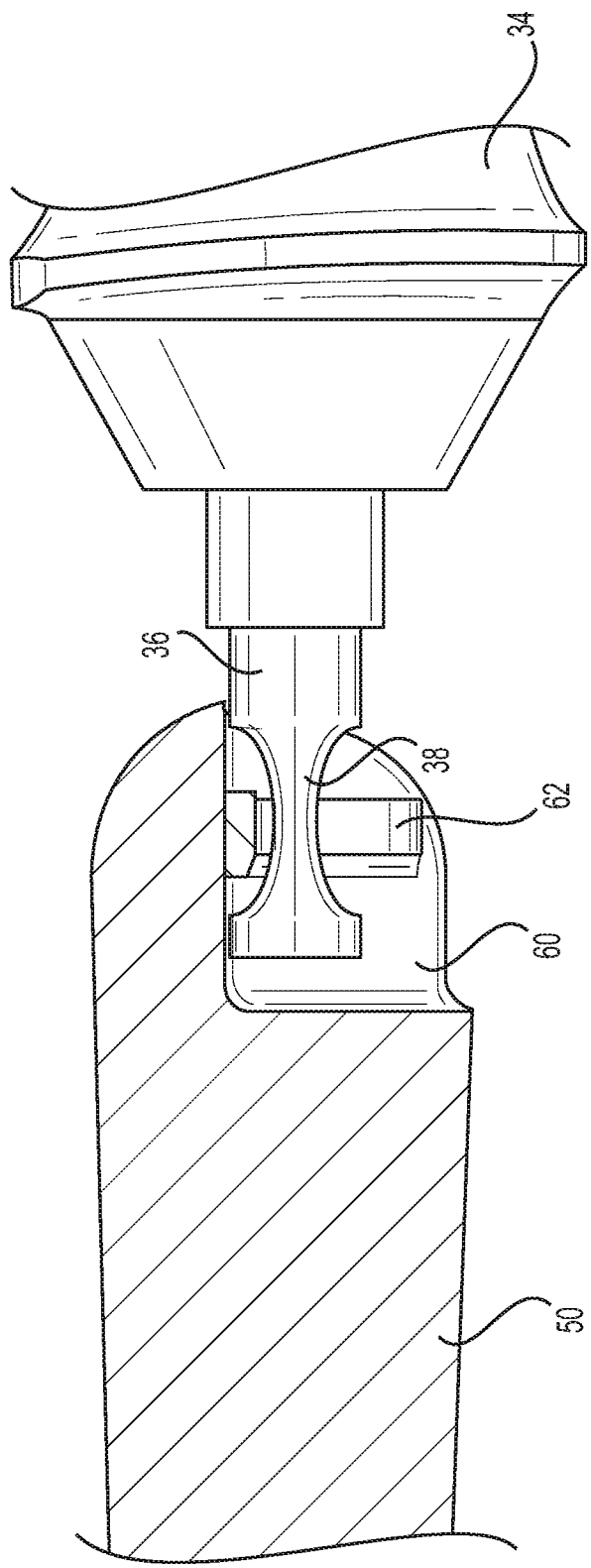
FIG. 5 is a cross-sectional side view of the stomper of FIGS. 3 and 4 engaging the auger of FIG. 2.

In addition to functioning as a conventional stomper, the stomper 50 of embodiments of the present disclosure functions as a tool for pulling the auger out of the throat portion. A channel 60 is defined in the end and side surfaces of the proximal handle end of the stomper 50. A bayonet 62 projects from the internal walls of the channel 60. "Bayonet" here indicates a reduced diameter subsection of channel 60. As illustrated, one embodiment of the bayonet 62 has a curved engaging surface to correspond with the circular surface of the auger protrusion 36 and groove 38. The bayonet 62 is able to engage the groove 38 on the protrusion 36 of the auger 30. As best illustrated in FIG. 5, and further described below, the distal end of protrusion 36 cannot fit through the bayonet 62 subsection of channel 60. Once groove 38 is positioned within bayonet 62, pulling stomper 50 away from auger 30 along the axis of the auger 30 withdraws or pulls auger 30 from throat portion 18.

In further detail, the stomper 50 is positioned such that the auger protrusion 36 is at least partially within the stomper channel 60 and the bayonet 62 engages the groove 38. Once engaged, the user can apply a pulling force to remove the auger from the food grinder. In other words, the bayonet is operable to transmit a pulling force on the stomper to the auger in order to remove the auger from the grinder. FIG. 5 illustrates the stomper 50 in position relative to the auger and one embodiment of the bayonet engaged with the groove (the stomper is shown in cross-section).

While the groove of the auger protrusion is illustrated having a curved (i.e., concave) shape, any suitable shape may be used. For example, the groove could have a squared shape or an angled (e.g., V-groove) shape. Having a differently shaped groove may or may not necessitate a change to the engaging surface of the bayonet.

Stomper 50 is used to push the meat product into the throat portion of the grinder. As such, it is already exposed to raw meat during use of the grinder and must be cleaned by the user. The presently disclosed improvement to grinders eliminates the need for a separate tool that can be lost and must also be cleaned after contacting the auger. Further, the present disclosure provides a simpler and less expensive solution relative to using an additional single-purpose tool. Overall, the lower costs and reduced parts improve the user experience.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

That which is claimed:

1. A stomper for a food grinder comprising:
 a distal end comprising a surface that engages food into a receiving tube of a food grinder;
 a proximal handle end comprising surfaces for a user to grasp the stomper while pushing food into the receiving tube of the food grinder;
 an elongated shaft between the distal end and the proximal handle end;
 a channel defined in the proximal handle end, the channel defined in an end surface and a side surface of the proximal handle end; and
 a bayonet comprising a reduced diameter subsection of the channel and projecting from three internal walls of the channel, the bayonet further comprising a curved engaging surface corresponding with a circular surface of a protrusion on an auger of the food grinder where a pulling force from the stomper is transmitted to the auger via the bayonet when the circular surface of the protrusion is positioned within the bayonet.

2. A food grinder system comprising:
 (a) a food grinder comprising:
  a base housing a motor;
  a throat portion coupled to the base;
  a receiving tube coupled to the throat, the receiving tube adapted for receiving food to be ground and introducing the food to be ground into the throat portion; and
  a selectively rotatable auger selectively insertable into and removable from the throat portion, the auger having a protrusion on a front end thereof comprising a circular surface; and
 (b) a stomper comprising:
  a distal end for pushing food into the receiving tube of the food grinder;
  a proximal handle end for a user to grasp the stomper while pushing food into the receiving tube of the food grinder;

an elongated shaft between the distal end and the proximal handle end;

a channel defined in an end surface and a side surface of the proximal handle end; and a bayonet comprising a reduced diameter subsection of the channel and projecting from three internal walls of the channel, the bayonet engaging the protrusion on the auger of the food grinder to transmit a pulling force from the stomper to the auger.

3. The stomper of claim 2, wherein the bayonet has a curved engaging surface.

4. A stomper for a food grinder comprising:

a distal end comprising a surface that engages food into a receiving tube of a food grinder;

a proximal handle end for a user to grasp the stomper while pushing food into the receiving tube of the food grinder;

an elongated shaft between the distal end and the proximal handle end;

a guard located on the elongated shaft that extends beyond an outer diameter of the elongated shaft;

a channel defined in the proximal handle end, the channel defined in an end surface and a side surface of the proximal handle end; and a bayonet comprising a reduced diameter subsection of the channel and projecting from one or more internal walls of the channel, the bayonet further comprising a curved engaging surface corresponding with a circular surface of a protrusion on an auger of the food grinder where a pulling force from the stomper is transmitted to the auger via the bayonet when the circular surface of the protrusion is positioned within the bayonet.

* * * * *